United States Patent
Bentley et al.

(10) Patent No.: US 9,922,467 B2
(45) Date of Patent: Mar. 20, 2018

(54) SYSTEM AND METHOD FOR PROCESSING DISTRIBUTION ITEMS IN A DISTRIBUTION NETWORK

(71) Applicant: United States Postal Service, Washington, DC (US)

(72) Inventors: Daniel Mark Bentley, Washington, DC (US); Nii-Kwashie Aryeetey, Washington, DC (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 14/597,103

(22) Filed: Jan. 14, 2015

(65) Prior Publication Data

US 2015/0199853 A1    Jul. 16, 2015

Related U.S. Application Data

(60) Provisional application No. 61/927,720, filed on Jan. 15, 2014.

(51) Int. Cl.
*G07B 17/00* (2006.01)
*G06Q 10/08* (2012.01)
(Continued)

(52) U.S. Cl.
CPC .......... *G07B 17/00661* (2013.01); *B07C 3/14* (2013.01); *B07C 3/18* (2013.01); *G06Q 10/08* (2013.01); *G06Q 20/042* (2013.01)

(58) Field of Classification Search
None
See application file for complete search history.

(56) References Cited

U.S. PATENT DOCUMENTS

| | | | |
|---|---|---|---|
| 5,758,574 A * | 6/1998 | Bernardo | G06K 19/06037 101/2 |
| 2004/0143354 A1* | 7/2004 | Kato | B07C 3/00 700/115 |

(Continued)

FOREIGN PATENT DOCUMENTS

| | | |
|---|---|---|
| JP | 2002-012311 | 1/2002 |
| JP | 2004-315116 | 11/2004 |

(Continued)

OTHER PUBLICATIONS

International Search Report and Written Opinion dated May 8, 2015 for International Application No. PCT/US2015/011459, which shares priority of U.S. Provisional Application filed Jan. 15, 2014, with captioned U.S. Appl. No. 14/597,103, and cites the above-identified reference numbered 1.

*Primary Examiner* — Matthew Bella
*Assistant Examiner* — Brian Shin
(74) *Attorney, Agent, or Firm* — Knobbe Martens Olson & Bear LLP

(57) ABSTRACT

Systems and methods for processing distribution items having unique identifiers affixed thereon. The unique identifiers can include computer readable codes and written alphanumeric strings generated by a user. A system receives the unique identifier and requests payment information from a user, and stores an association between the unique identifier and the payment information, and processes the item according to the payment information.

17 Claims, 6 Drawing Sheets

(51) Int. Cl.
 B07C 3/18 (2006.01)
 G06Q 20/04 (2012.01)
 B07C 3/14 (2006.01)

(56) References Cited

U.S. PATENT DOCUMENTS

| 2010/0324959 | A1* | 12/2010 | Templeton | G06Q 10/08 |
| | | | | 705/334 |
| 2011/0113478 | A1* | 5/2011 | Chatte | G07B 17/0008 |
| | | | | 726/7 |
| 2012/0158581 | A1* | 6/2012 | Cooley | G06Q 20/102 |
| | | | | 705/40 |
| 2013/0024326 | A1 | 1/2013 | Dearing et al. | |

FOREIGN PATENT DOCUMENTS

| JP | 2012-530974 | 12/2012 |
| JP | 2013-230910 | 11/2013 |

* cited by examiner

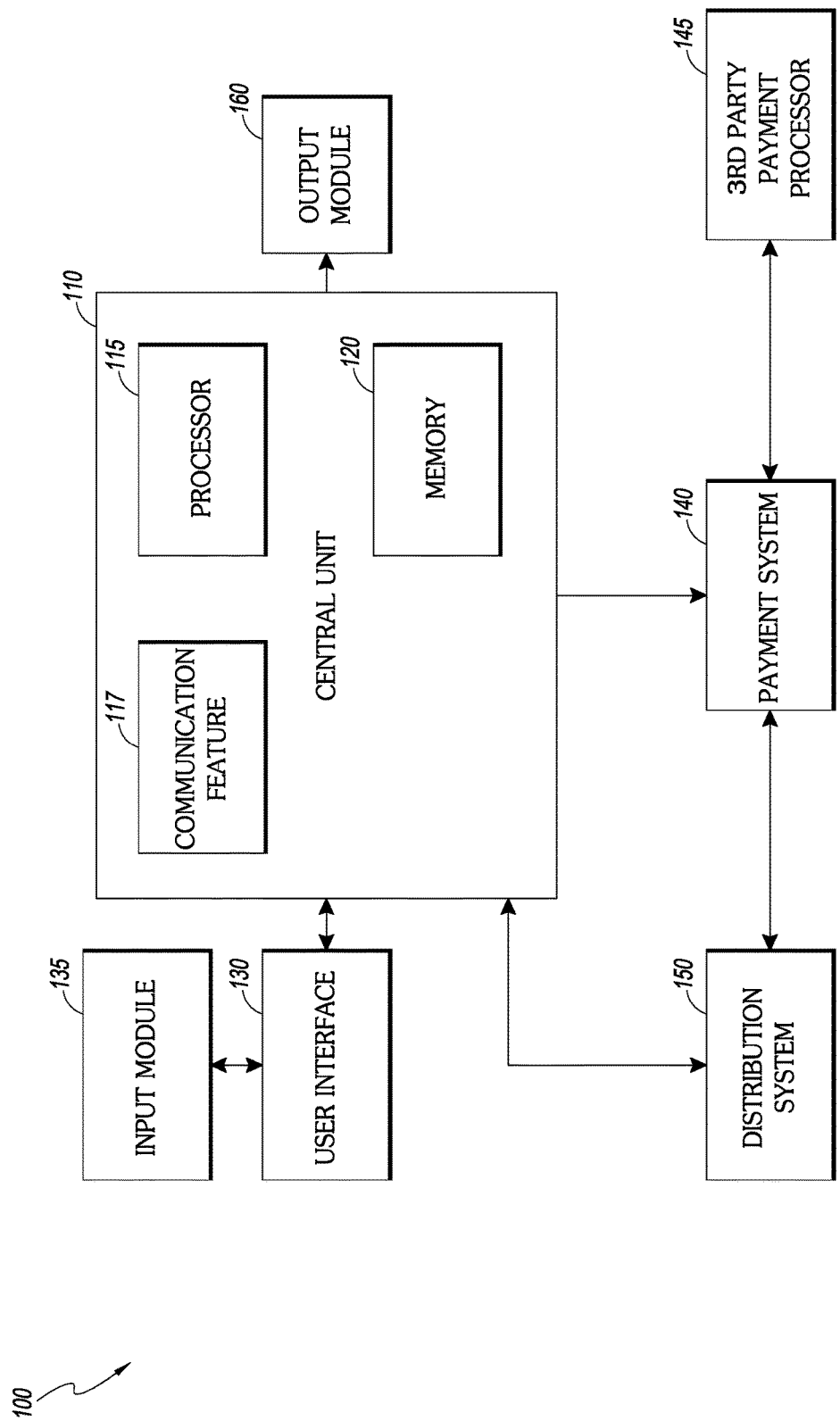

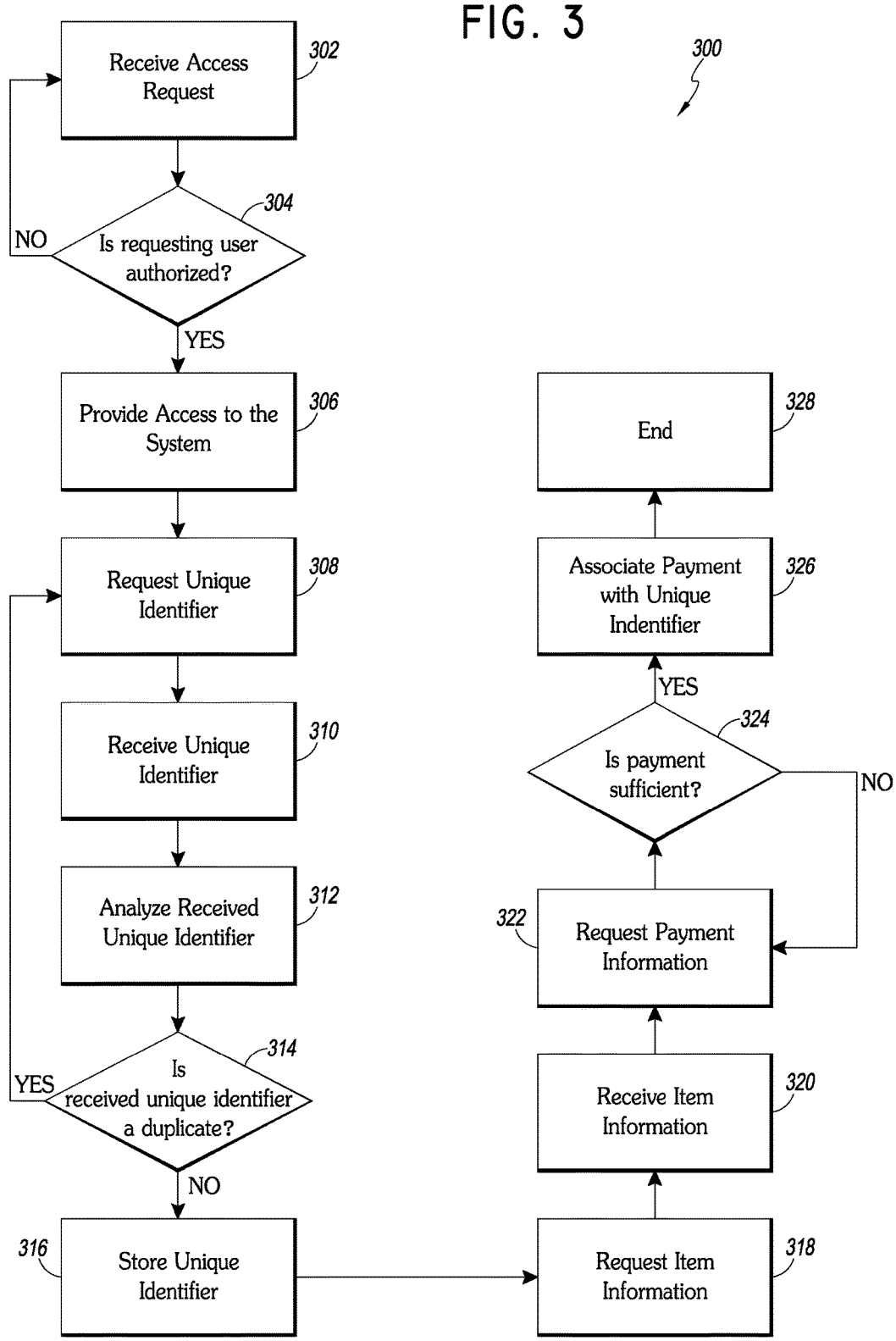

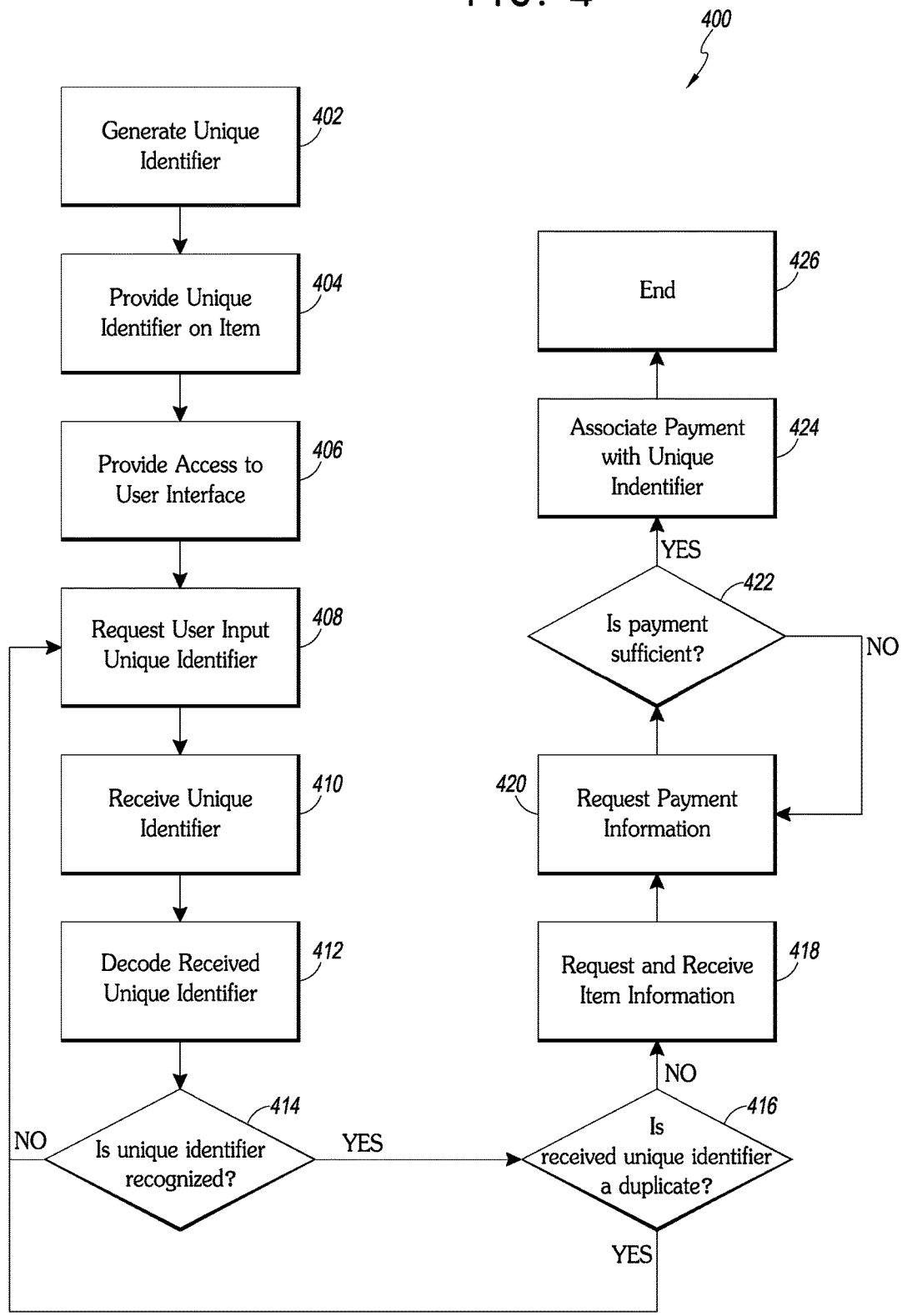

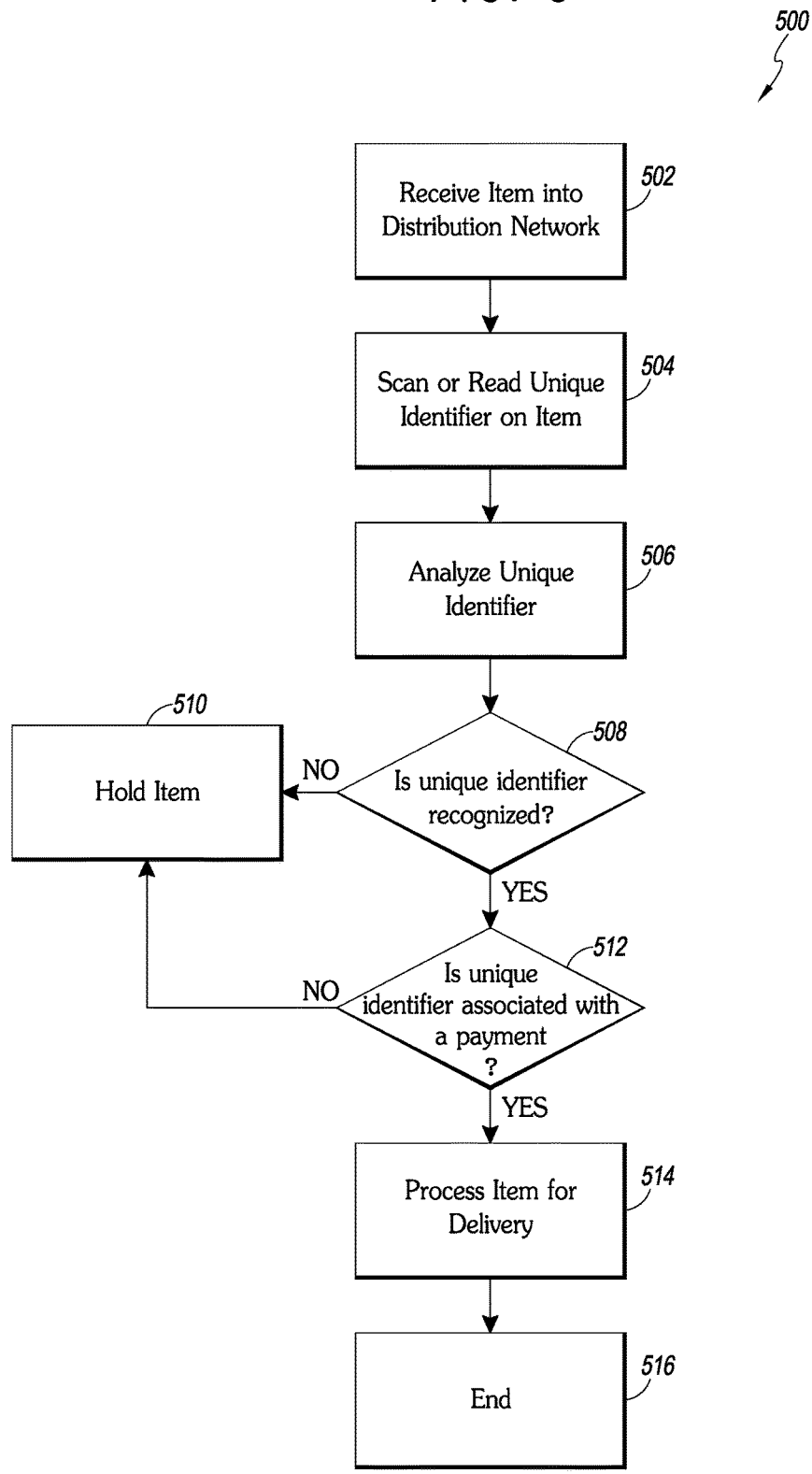

SYSTEM AND METHOD FOR PROCESSING DISTRIBUTION ITEMS IN A DISTRIBUTION NETWORK

INCORPORATION BY REFERENCE TO ANY PRIORITY APPLICATIONS

This application claims the benefit of U.S. Provisional Application 61/927,720, filed Jan. 15, 2014, entitled SYSTEM AND METHOD FOR PROCESSING DISTRIBUTION ITEMS IN A DISTRIBUTION NETWORK, the entire contents of which are hereby incorporated by reference. Any and all applications for which a foreign or domestic priority claim is identified in the Application Data Sheet as filed with the present application are hereby incorporated by reference under 37 CFR 1.57.

BACKGROUND

Field

This disclosure relates to a system and method of processing an item or a plurality of items in a distribution network, including providing payment for the distribution items to be distributed in the distribution network.

SUMMARY

Some aspects of the present disclosure describe a method of processing an item comprising receiving an item in a distribution network; processing the item on one or more pieces of item processing equipment comprising an imaging device; reading the unique identifier on the item using the imaging device; querying, by a processor, the memory for information corresponding to the read unique identifier; and providing instructions to the item processing equipment to move the item into one of a plurality of locations based on the information corresponding to the read unique identifier.

In some embodiments, a method for processing an item comprises receiving, by a processor, information related to a unique identifier associated to an item; analyzing the information related to the received unique identifier; receiving, by a processor, item information relating to the item; storing, in a memory, the unique identifier and the item information; associating, in a memory, the unique identifier with the item information; generating payment information regarding the item; and associating, in a memory, the payment information with the unique identifier.

In some embodiments, the unique identifier is generated by a user.

In some embodiments, the unique identifier comprises an alphanumeric string of characters.

In some embodiments, receiving information related to a unique identifier comprises receiving a captured image of the unique identifier.

In some embodiments, analyzing the information related to received unique identifier comprises performing optical character recognition of the captured image of the unique identifier to identify the alphanumeric string of characters.

In some embodiments, the unique identifier is a computer readable code.

In some embodiments, the unique identifier includes encoded item information relating to the item, and receiving item information comprises decoding the encoded item information.

In some embodiments, the method further comprises receiving the item in a distribution network; reading the unique identifier affixed to the item; querying, by a processor, the memory for information corresponding to the read unique identifier; and processing the item based on the information corresponding to the read unique identifier.

In some embodiments, querying the memory comprises querying the memory for payment information associated with the read unique identifier, and wherein processing the item comprises processing the item based on the payment information associated with the unique identifier In some embodiments, reading the unique identifier comprises performing optical character recognition of the unique identifier.

Another aspect of the present disclosure describes a system for processing items in a distribution network comprising a user interface configured to receive a unique identifier associated with an item and configured to receive item information relating to the item; a processor in communication with the user interface configured to receive information related to the received unique identifier and to analyze the information related to the received unique identifier and configured to receive the item information from the user interface; a payment system, in communication with the processor, configured to receive the item information from the processor and generate payment information regarding the item; a memory in communication with the processor configured to store the information related to the received unique identifier, the item information, and the payment information; and wherein the processor is further configured to associate the information related to the received unique identifier with the item information and the payment information.

In some embodiments, the user interface is configured to receive the unique identifier which has been generated by a user.

In some embodiments, the unique identifier comprises an alphanumeric string of characters.

In some embodiments, the user interface is configured to receive a captured image of the alphanumeric string of characters.

In some embodiments, configured to analyze the information related to received unique identifier comprises configured to perform optical character recognition of the captured image of the unique identifier to identify the alphanumeric string of characters.

In some embodiments, the unique identifier is a computer readable code.

In some embodiments, the unique identifier includes encoded item information relating to the item, and the processor is configured to decode the item information encoded unique identifier.

in some embodiments, the system further comprises a processing apparatus in communication with the processor, wherein the processing apparatus is configured to receive the item having the unique identifier thereon; read the unique identifier on the item to determine information associated with the unique identifier; and communicate the information associated with the unique identifier to the processor; the processor further configured to query the memory for information corresponding to the information associated with the read unique identifier and to determine instructions for processing the item.

In some embodiments, the processor is configured to query the memory for payment information associated with the read unique identifier, and wherein processing apparatus is further configured to process the item based on the payment information associated with the unique identifier In some embodiments, the processor is configured to perform optical character recognition of the unique identifier.

Another aspect described herein relates to a system for processing an item comprising means for receiving information related to a unique identifier associated with an item; means for analyzing the information related to the received unique identifier; means for receiving item information relating to the item; means for storing the unique identifier and the item information; means for associating the unique identifier with the item information; means for generating payment information regarding the item; and means for associating the payment information with the unique identifier.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 1 is a block diagram of an embodiment of a system for processing distribution items.

FIG. 3 is a flowchart illustrating an embodiment of a process for processing a distribution item having a unique identifier thereon.

FIG. 4 is a flowchart illustrating an embodiment of a process for processing a distribution item having a unique identifier generated by the distribution network.

FIG. 5 is a flowchart illustrating an embodiment of a process for distributing an item according to information associated with a unique identifier on the item.

DETAILED DESCRIPTION

Figure 2A:
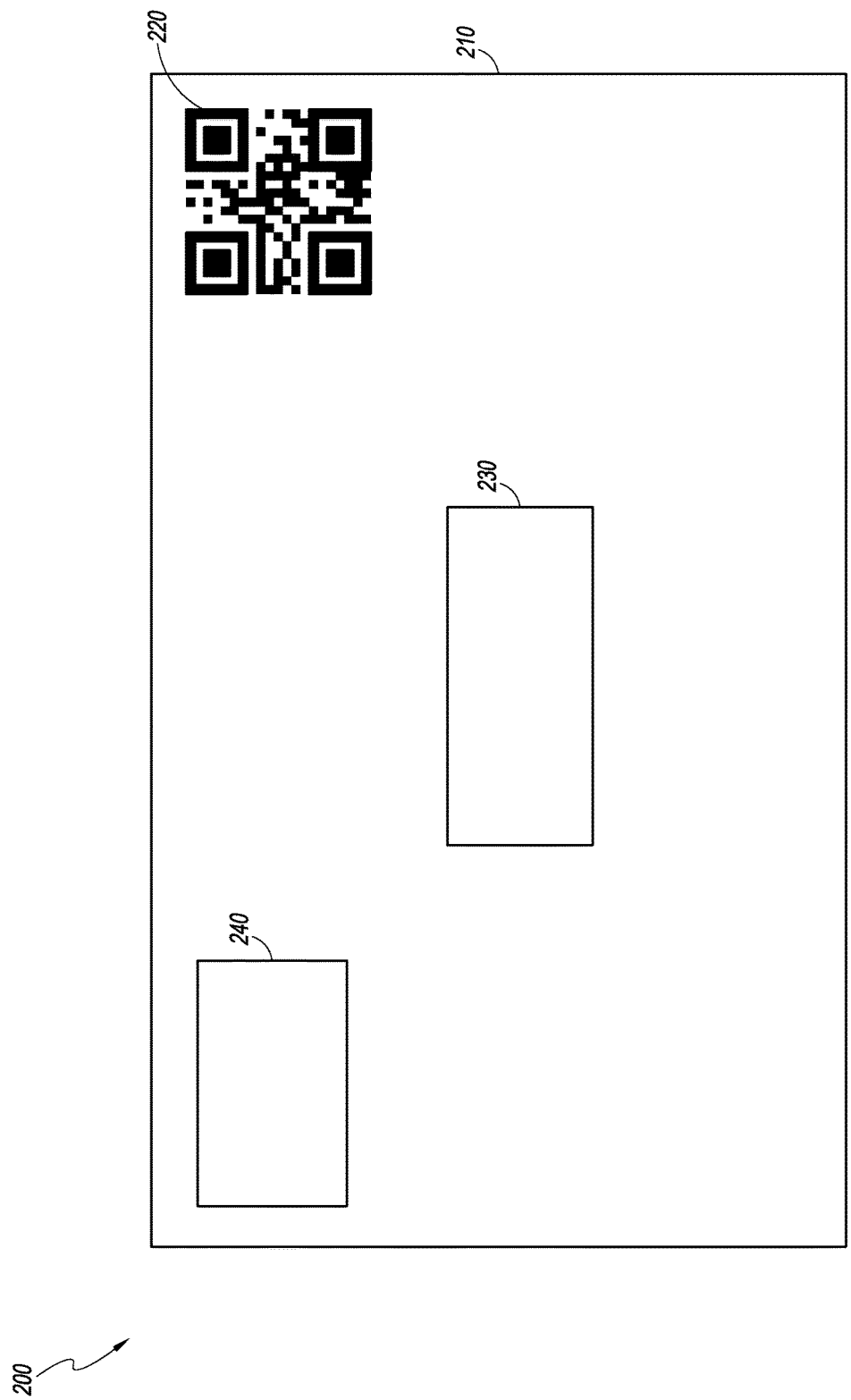
FIG. 2A is an embodiment of an item having a unique identifier thereon.

The following detailed description is directed to certain specific embodiments. However, the invention(s) disclosed herein can be embodied in a multitude of different ways as defined and covered by the claims. In this description, reference is made to the drawings wherein like parts are designated with like numerals throughout.

The features, aspects and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

Reference to the terms "mail," "mailpiece," or "item" includes letters, flats, postcards, parcels, cards, periodicals, correspondence, packages, and any other items or item types that are handled and distributed in or by a distribution network, delivery system, including an electronic delivery system, and the terms are used interchangeably herein. Also as used herein, the term item may refer to items processed by a delivery network, such as mail, letters, postcards, parcels, or may refer to any item in any distribution network such as items in a warehouse, a logistics network, airport baggage handling networks, or any other type of distribution network A user may desire to send, ship, track, or otherwise process an item within a distribution network. The distribution network may require payment of a fee in order to send or ship the item. Distribution networks frequently require payment of postage or fees in order to receive, process, ship, send, and/or deliver items. For example, payment for processing, shipping, or sending items can be provided by purchasing stamps, as in the case of the United States Postal Service, or by paying directly for the item and its processing or shipping at a distribution network facility, such as a post office, a commercial shipment center, retail establishment, or similar facility, which must often be done in person. Payment for existing shipping methods usually requires the distribution to provide an indicia of payment for shipping or sending costs to be affixed or placed on the item to be shipped or sent, such a stamp, a code, or other similar indicia.

Some aspects of the present disclosure provide for payment for an item to be distributed in a distribution network using an identifier which is affixed, attached, written, printed, or otherwise placed on the item. The identifier may be affixed, attached, written, printed, or otherwise placed on the item by the user or sender of the item, without the need for a distribution network to physically the payment indicia on the item. In some embodiments, the identifier is a unique identifier chosen by a user or by the distribution network upon request of the user, which is received by the distribution network, stored in a memory and associated with a user and/or a user's payment method. When the item is received into the distribution network, the distribution network can identify the unique identifier, associate it with a user's payment or payment account, and process the distribution item based on the payment.

As will be understood herein, the term user may refer to a person, such as an individual, a corporation, an organization, a computer system or network adapted to interact with the system 100, or any other desired entity capable of interfacing with the system 100. Also as described herein, unique identifiers may be computer readable codes, text strings, images, icons, logos, and the like. For ease of discussion, the term unique identifier can refer to an actual computer readable code, such as a barcode or QR code, and may also refer to information encoded within the unique identifier, and/or information decoded or extracted from the computer readable unique identifier. Additionally, when describing an image of the unique identifier, such as when transmitting an image of a unique identifier, such as a text string, image, icon, or logo, the present application contemplates both the sending of the actual electronic image, sending a copy of the electronic image, sending data indicative of the image, or sending data in any other form which communicates the contents or features of the image of the unique identifier. That is, the concept of transmitting an image of a unique identifier does not necessarily mean that the actual image, or that each pixel of the image, is transmitted, but may also mean that information or data equivalent, corresponding to, or derived from the image (referred to herein as image data) is transmitted.

The present disclosure describes systems and methods for using a unique identifier on an item to provide payment information and item information to the distribution network. The United States Postal Service is an exemplary embodiment of a distribution network described herein, although the present disclosure is not limited thereto. To illustrate, a user may desire to send an item using the postal service, or any other distribution network. The user may not have stamps or postage, and either may not desire to or is unable to purchase stamps or postage, or to physically travel to a location to buy stamps, postage, or another indicia of payment for a distribution network. As will be described in greater detail below, the present disclosure describes a system and method whereby the user may use a user interface, such as an application on a mobile computing device, or on a computer accessible interface, to provide the Postal Service with information regarding the item and to provide payment information for the item. For example, the user may hand write any sequence of letters and/or numbers of a predetermined length on the item to be mailed. The user may then capture an image of the sequence of letters and/or numbers on the item using a mobile computing device or computer accessible interface. The image is transmitted via a wired or wireless network, including a cellular network, and is transmitted to the Postal Service. The Postal Service can analyze the transmitted sequence of letters and/or numbers to determine the sequence, which the Postal Service stores in a memory. The user can then provide payment, either via a credit card or using some trusted third party payment system, for postage. The Postal Service stores the payment information and associates the payment information with the sequence of letters and/or numbers on the item. After the item is received into the Postal Service distribution network, such as through a mailbox or drop-off location, the postal service can scan the item on mail processing equipment, interpret the sequence of numbers and/or letters, and determine whether postage has been paid for the item. The foregoing description is exemplary only, and is not intended to limit the scope of the present disclosure thereto. This and other exemplary embodiments will be described in greater detail below.

FIG. 1 depicts a system 100 for processing items in a distribution network. The system 100 comprises a central unit 110, a memory 120, a user interface 130, a payment system 140, a distribution system 150, and an output module 160. The central unit 110 is in communication, either wired or wirelessly, with at least the memory 120, the user interface 130, and the payment system 140. The central unit 110 may be in communication with the distribution system 150, the payment system 140, and the output module 160. In some embodiments, the system 100 may comprise a part of the larger distribution system 150. In some embodiments, the output module 160 may also be in communication with the distribution system 150. The distribution system 150 may comprise a distribution network facility having a processing apparatus, such as mail processing equipment, configured to scan or read unique identifiers located on items received into the distribution network facility. In some embodiments, the distribution system 150 may be a computer, a processor, or other similar device in communication with one or more processing apparatuses at distribution network facilities.

The central unit 110 may comprise or be a component of a processing system implemented with one or more processors. The central unit 110 may be a network of interconnected processors housed in one or more terminals. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The central unit 110 may comprise a processor 115 such as, for example, a microprocessor, such as a Pentium® processor, a Pentium® Pro processor, a 8051 processor, a MIPS® processor, a Power PC® processor, an Alpha® processor, a microcontroller, or the like. The processor 115 typically has conventional address lines, conventional data lines, and one or more conventional control lines. The central unit 110 is in communication with a memory 120, which may include, for example, RAM memory, flash memory, ROM memory, EPROM memory, EEPROM memory, registers, hard disk, a removable disk, a CD-ROM, or any other form of storage medium known in the art. The memory 120 may include, for example, software, at least one software module, instructions, steps of an algorithm, or any other information. In some embodiments, the processor 115 performs processes in accordance with instruction stored in the memory 120. These processes may include, for example, controlling features and/or components of the system 100, and controlling access to and from, and transmitting information and data to and from the central unit 110 and the constituent components of the system 100, as will be described herein. The central unit 110 is configured to coordinate and direct the activities of the components of the system 100.

The central unit 110 is configured to generate or receive a unique identifier for each item identified by a user via the user interface 130. This process will be described in greater detail below.

The central unit 110 is further configured to request and/or receive item information, such as item size, weight, type, volume, dimensions, contents, destination, recipient, or any other desired information relating to the item. The central unit 110 may provide some or all of the item information to the payment system 140 in order for the payment system to determine the amount of payment, such as postage or fees, required in order to process the item. The payment system 140 can include a processor and a memory in addition to processor 115 and memory 120 the central unit 110. The central unit 110 is further configured to interface with the payment system 140 to effect payment for the item. The central unit 110 may request from the user a payment or payment information via the user interface 120. The central unit 110 may accomplish this by receiving a credit card payment, or access to a trusted third party payment processor 145, which process will be described in greater detail below. Upon receipt of the payment or payment account information, the payment system 140 or the central unit 110 may generate payment information, and may store the payment information to the memory 120.

The central unit 110 is also configured to associate payment information with the unique identifier for the item for which payment was requested or made. This association is stored in the memory 120, and is accessible by the payment system 140, the central unit 110, and/or the distribution system 150.

In some embodiments, the processor 115 is connected to a communication feature 117. The communication feature 117 is configured for wired, and/or wireless communication. In some embodiments, the communication feature 117 communicates via telephone, cable, fiber-optic, or any other wired communication network. In some embodiments, the communication feature 117 may communicate via cellular networks, WLAN networks, or any other wireless network. The communication feature 117 is configured to receive instructions and to transmit and receive information among components of the system 100, and in some embodiments, with other resources outside system 100, as desired.

The memory 120 is configured to store information relating to users of the system 100, items, and unique identifiers generated by or provided to the system. The memory 120 may store payment information or payment account information associated with users of the system 100. The central unit 110 may provide the payment information for an item to the payment system 140 and/or the distribution network. The memory 120 may comprise a database, a comma delimited file, a text file, or the like. The memory 120 may be part of the same computer or network which comprises the central unit 110. In some embodiments, the memory 120 may be external to the central unit 110.

The user interface 130 is configured to provide user access to the system 100. The user interface 130 may be provided via a website or internet portal accessible from an internet-enabled computer or mobile computing device such as a smartphone or tablet computer, or on a dedicated terminal. In some embodiments, the user interface 130 can be provided as an application configured for use on a smartphone, tablet computer, or other mobile computing device.

The user interface 130 provides a user with options to log in to the system 100 using user-specific credentials, which may have been previously established with the distribution network or the system 100. The user interface 130 also provides a user the ability to register for an account and provide credentials to the user for accessing the system 100. The user interface 130 is further configured to request and receive item information, unique identifier information, and any other desired information. The user interface 130 communicates the received information to the central unit 110, which then stores the received information in the memory 120. The user interface 130 also provides instructions and information from the central unit 110 to a user, and communicates requests for payment for the item based on the payment determined by the payment system 140. The user interface 130 also is configured receive a payment or payment account information from the user. The user interface 130 can provide a user access to a user's account information and preferences stored in the memory 120 or elsewhere. A user can update the user's settings, preferences, unique identifier, payment account information, and the like via the user interface 130.

The user interface 130 is in communication with an input module 135. The input module 135 may be part of the hardware on which the user interface 130 is provided or running, and can include a camera, a barcode scanner, a QR code reader, a keyboard, stylus, mouse, or other input device. In some embodiments, the input module 135 may comprise more than one of the above input devices. In some embodiments, the user interface 130 is provided on a user's smartphone running an application which performs the function of the user interface 130. In this case, the input module 135 can be a camera on the user's smart phone, when the smart phone is running the user interface 130 application. A user can use the input module 135 to provide item information, unique identifier information, payment information, and any other requested or desired information to the user interface 130. This process will be described in greater detail below.

Input and output information provided via the user interface 130 may be customizable for or by a particular user, such that the user interface 130 provides information and reports regarding items associated with the user's account in the distribution network, such as a list of payments, a list of unique identifiers, a list of items, and the like. In some embodiments, the user interface 130 may be customizable for a particular such that a user may develop a personalized or custom user interface 130 which provides functionality specific for the user.

The user interface 130 can be configured to receive a payment from a user, and provide payment information to the payment system 140 via the central unit 110. This information may include whether a fee or payment, such as postage, for pick-up and/or delivery of the item has been paid, or whether the user has established debit account, or has agreed to other billing or payment arrangements.

The payment system 140 is in communication with a third party payment processor 145. The payment system 140 is also in communication with the distribution system 150. The payment system 140 is configured to calculate a fee or payment required for processing an item within the distribution network. As described above, the payment system 140 can request item information, such as an item's size, weight, contents, destination, and the like, and use the item information to calculate a fee or payment required. The payment system 140 communicates the fee due to the user interface 130 via the central unit 110.

The payment system 140 is configured to receive the payment information from the user interface, which may be in the form of a credit card payment, or a debit from an account set up with the distribution network associated with or belonging to the user. The payment system 140 communicates with the third party payment processor 145 to receive the payment according to the payment information provided by the user. In some embodiments, the third party payment processor 145 may be a credit card company, a bank, PayPal, Google Wallet, CAPS, BillMe Later, a cellular service provider, or other similar payment processors. To illustrate, a user registered with the system 100 may establish PayPal as a means for providing payment for the user's items to be processed and shipped by the distribution network. When a user logs in to the system 100 via the user interface 130, the user may tell the payment system 140 to access the user's PayPal account to process payment for an item to be shipped or sent. The user's PayPal account information may be stored in the memory 120. Alternately, the user interface 130 may provide access to PayPal services, or it may navigate the user to the PayPal website, or it may otherwise facilitate the PayPal transaction. The payment system 140 then receives the payment information from PayPal, and communicates confirmation of payment to the central unit 110. The central unit 110 associates the payment confirmation with the user, and with the unique identifier for the item, and stores the payment confirmation and associations in the memory 120.

When the item is physically received into the distribution network, the distribution network can scan, read, or otherwise receive the unique identifier. By storing the associations between the unique identifier, the payment information, and the user, the distribution system 150 can, upon scanning the unique identifier, access the payment information for the item. For example, when the distribution system 150 receives the unique identifier, the distribution system 150 may query the payment system 140 or the central unit 110 to request payment information associated with the unique identifier. This query can include whether appropriate payment has been received for the item bearing the unique identifier, whether the user's account provides for later or batch billing, and the like. If the payment system 140 of the central unit 110 has payment information associated with the unique identifier on the item, the payment system 140 or the central unit 110 communicates this to the distribution system 150, and the distribution system 150 processes the item for delivery. If no payment confirmation has been received, the distribution system 150 may not process the item for delivery. The distribution network may send a message to the user interface 130 via the central unit 110, informing the user that no payment for the item has been received.

The output module 160 may be in communication with the central unit 110. The output module 160 can be configured to generate physical representations of unique identifiers which have been generated by the central unit 110 or the user via the user interface 130. This process will be described in greater detail below. In some embodiments, the output module 160 may be in communication with the user interface 130. In some embodiments, the output module 150 may be embodied in hardware which comprises the user interface 130, such as a printer connected to an internet-enabled terminal through which the user can access the system 100.

The unique identifier can be used to identify an item received in the distribution network. As described above, the unique identifier can be generated by the user or by the central unit 110, and is stored in the memory 120. To illustrate, in some embodiments, a user may access the user interface 130, and request an item be delivered via the distribution system 150. The user interface 130, directed by the central unit 110, provides options for assigning the unique identifier. The user interface 130 may ask the user whether the user would like to generate the unique identifier, or whether the user would like the system 100 to generate and assign a unique identifier to the item. The unique identifier described herein can be of several forms. In some embodiments, the unique identifier may be a computer readable code, such as a QR code, a barcode, an alphanumeric string, a pictorial representation, such as an icon, logo, photograph, or image, or any other desired identifier. Where the user requests that a unique identifier be assigned, such as a computer readable code, the central unit 110 generates, for example, a QR code, and associates the code with the user, and with any item information the user provides regarding the item. Upon receipt of payment, the central unit 110 may output the QR code to the output module 160, such as to a user's printer, or to a mobile computing device as a downloadable file or graphical representation. The output module 160 may be collocated with the user, and may be in communication with the user interface 130, such that the user may print the unique identifier provided by the central unit 110 and affix it to the item.

Figure 2B:
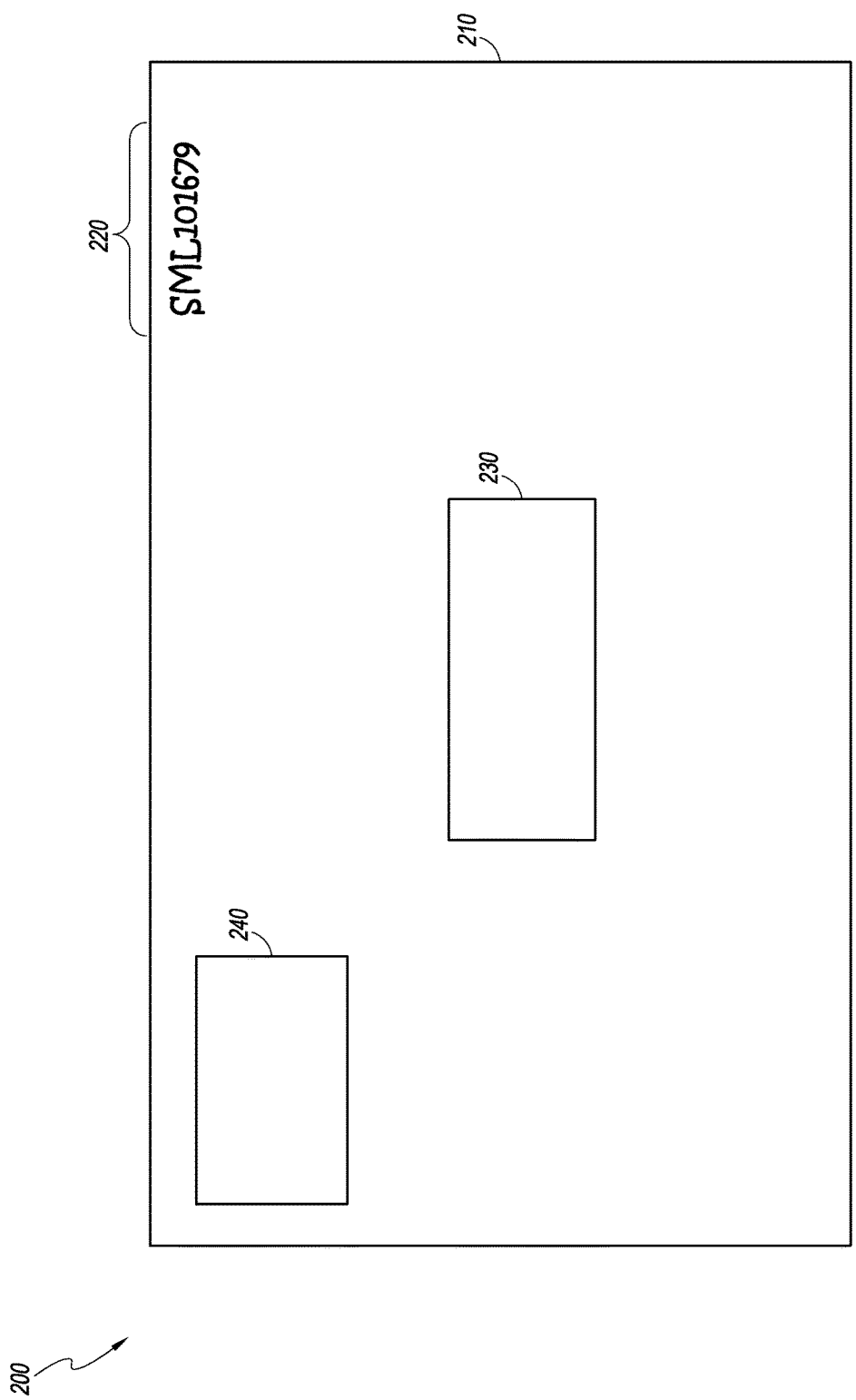
FIG. 2B is another embodiment of an item having a unique identifier thereon.

FIG. 2A depicts an embodiment of an item 200 having a substrate 210 with unique identifier 220 affixed thereto. The item 200 also includes recipient information 230 and sender information 240. Recipient information 230 and sender information 240 are depicted in FIGS. 2A and 2B as rectangles, which indicating the areas of an item where a recipient identifier and a sender identifier, such as an address or other delivery point may be placed. By placing substrate 210 into the output module 160, such as a printer, a user can print the unique identifier 220, which has been assigned by the control unit 110 directly onto the substrate 220. The unique identifier 220 can then be associated with payment information by the central unit 110. When item 200 is received into the distribution system 150, the distribution system 150 can scan the unique identifier 220 and determine whether appropriate payment for the item 200 has been received. in some embodiments, the output module 160 can generate the unique identifier 220 on an adhesive or other material which can then be placed on or affixed to the item 200.

In some embodiments, the recipient information may comprise a virtual address, such as a vanity address or virtual post office box such as those described in U.S. patent application Ser. No. 13/179,442, filed Jul. 8, 2011, the entire contents of which are herein incorporated by reference. In some embodiments, the virtual address may comprise an email address. In some embodiments, the recipient information may comprise a recipient's email address. In the case of virtual addresses, the memory 120 may comprise a database or relational table which associates virtual addresses and/or email addresses with physical addresses. The distribution system 150 may be configured to scan or read the recipient information 230 in addition reading to the unique identifier 220. Upon scanning or reading an email address as recipient information, the central unit 110 may query the memory 120 to determine whether a physical address associated with the scanned email address is present. If a physical address is present, the distribution system 150 can sort the item for delivery to the physical address associated with the email address. In some embodiments, the distribution system 150, via the output module 160, may print a label having the physical address associated with the email address printed or written thereon, and attach the label to the substrate 210 over the top of, or adjacent to the recipient information 240.

In this way, a user may send an item to a recipient without knowing the recipient's physical location or address merely by knowing the recipient's email address or virtual address. The memory 120 may compile a database of email addresses associated with physical addresses from individuals who volunteer to provide their email address and physical address, such as users of popular retail websites like Amazon.com®, eBay®, and others. Further, companies which provide email services may provide email addresses and corresponding physical addresses to the memory 120. In some embodiments, the provision of email addresses and corresponding addresses may be effected on an opt-in basis, or may require explicit permission of the owner of the email address.

In some embodiments, a user may purchase or create an item 200 with the unique identifier 220, such as a QR code, already printed or affixed to the item 200, such as an envelope, greeting card, or postcard. The user may access the user interface 130 and request to send the item 200 through the distribution network. In response, the user interface 130 requests that the user provide the unique identifier 220 via the input module 135. The user can use input module 135 to scan, read, or capture the computer readable code or QR code on the item 200. The user interface 130 can then transmit the received computer readable code or QR code, as decoded information or as an image, to the central unit 110, wherein the computer readable code or QR code can be verified to be unique against other unique identifiers for other items which are in the memory 120 or which have been already assigned or associated with the item 200 by the central unit 110.

In some embodiments, the distribution network may provide pre-printed unique identifiers 220 on envelopes, postcards, greeting cards, and the like. The distribution network can thus ensure that duplicate identifiers are not provided by users, and therefore, no two items will be associated with the same unique identifier.

In some embodiments, a user can choose, via the user interface 130, to generate the unique identifier. The user may not have access to a printer, or may not desire to purchase a pre-printed envelope, postcard, or the like. In such a case, the user may generate a unique identifier 220 and write, draw, apply, and/or affix the user-generated unique identifier 220 to the substrate 210. As illustrated in FIG. 2B, the unique identifier 220 is an alphanumeric string selected by the user. The user may generate any desired alphanumeric string, such as a 9-digit string, and hand write the alphanumeric string on the item 200. In some embodiments, the user may print a label having the alphanumeric string thereon, and then affix the label to the substrate 210. As will be described in greater detail below, the user can capture and send an image of the item 200 having the hand written or drawn unique identifier 220 thereon, which can then be decoded, identified, or otherwise processed by the distribution network as indicia for postage or payment.

The user can request that the system 100 provide the alphanumeric string. In this case, the central unit 110 generates a unique alphanumeric string which is not already stored in the memory 120, and the user interface 130 displays the generated string to the user. The user can then apply the generated string to the item.

Using the input module 135, the user can provide the unique identifier 220 to the central unit 110. For example, where a user is accessing the user interface on a camera-enabled smartphone or other mobile computing device, the user can take a picture or capture an image of the item 200 having the unique identifier 220 thereon, and transmit the image to the central unit 110. The central unit 110 is configured to receive the picture of the unique identifier 220, and is configured to perform optical character recognition (OCR) on the unique identifier to extract, for example, an alphanumeric string. The alphanumeric string can then be checked against existing unique identifiers in stored in the memory 120 to ensure unique identifiers 220 are not duplicated on separate items.

Although FIGS. 2A and 2B depict embodiments which include the unique identifier 220, the recipient information 230, and sender information 240 placed in the locations traditionally found on envelopes used in the postal system, embodiments of the present disclosure are not limited thereto. For example, the unique identifier 220 may be located in any desired location on the item, such as in the upper left corner, the center, along one edge, or on the reverse of the item (not shown). Furthermore, although traditional envelopes/letters are depicted, a person of skill in the art will understand this disclosure is not limited thereto. For example, the unique identifier 210 substrate may be a box, such as for a parcel, a postcard, a periodical, newspaper, flat, a piece of inventory in a warehouse, a suitcase in a baggage processing system, or any other desired item in any type of distribution network.

In some embodiments, the user may upload an image of the unique identifier, wherein the central unit 110 stores the image in memory, or stores data indicative of the image in memory. In this way, the handwriting of the user on the substrate 210 may comprise a feature of the unique identifier. The central unit 110 can be configured to recognize handwriting, or distinguish the same alphanumeric string of characters from another based on the unique handwriting of a specific user. If an item is received into the distribution system 150 having the same character string as another unique identifier 220, the central unit 110 can compare the images or the data indicative of the images to differentiate the identifiers. In some embodiments, the unique identifier need not comprise an alphanumeric string, but may be a picture, an image, a doodle, drawing, photo, or other desired identifier placed on the substrate by the user, which is then uploaded to the central unit 110.

As will be described in greater detail below, the user interface 130 transmits a prompt to a user for payment of postage or a fee for the item 200 identified by the unique identifier 220, and transmits information received from the use to the central unit 110. The central unit 110 associates a payment status, or payment confirmation with the unique identifier 220 and the user and stores the association in the memory. The association of the unique identifier 220 and the payment confirmation indicates to the distribution network that postage or payment has been made for an item received bearing the unique identifier 220, and that the item 200 should be processed.

FIG. 3 is a flow chart depicting a process for assigning a unique identifier for an item. Process 300 begins in step 302, wherein the user interface 130 receives a request to access the system 100. The request may come from a user using an internet enabled computer terminal, an internet browser, or an application on a smartphone or tablet computer providing the user interface 130. A person of skill in the art will understand that these access points are exemplary only, and the scope of the disclosure is not limited thereto. The request may be in the form of a user providing login credentials or otherwise attempting to login to the system 100.

Upon receipt of the credentials, the process 300 moves to decision state 304, wherein it is determined whether the user requesting access is authorized. The central unit 110 may receive the login credentials from the user interface 130, and query the memory 120 for corresponding credentials. If no corresponding user or account is found in the memory 120, the process 300 returns to step 302, wherein login credentials can be reentered.

If a user or account is found having corresponding credentials stored in the memory 120, the process 300 moves to step 306 wherein access is provided to the system 100 via the user interface.

Upon providing access in step 306, the process 300 moves to step 308, wherein a unique identifier is requested. The central unit 110 can request that the user provide the unique identifier, and input the unique identifier using the input module 135.

in step 308, as described above, the user generates an alphanumeric string, an image, a logo, or an icon and draws, writes, or prints the unique identifier on the item. In some embodiments, the user accesses the user's account to obtain a previously stored icon, image, logo, or the like. The user can output the stored icon, image, or logo, which is associated with the user and the user's payment account, and print the icon, image, or logo directly onto an item to be shipped. In some embodiments, the output module 160 prints the icon, image, or logo, which can then be placed on or affixed to the item.

For example, a company using the distribution network to send items may register for an account with the distribution network. The company, as the user, can identify the company's logo, or other desired pictorial representation as an indicia for payment, and store this information with the central network. When an item is to be sent, the user accesses the system 100, produces the logo as indicia for payment, and places the logo on the item as described elsewhere herein.

In some embodiments, the central unit 110 may generate the unique identifier and display or transmit the unique identifier to the user interface 130 and ultimately to the user, from which the user can print or hand write the unique identifier on the item.

Upon requesting the unique identifier, the process 300 moves to step 310, wherein the central unit 110 receives the unique identifier via the user interface 130. For example, the user interface 130 can obtain an image of the unique identifier written on or affixed to the item captured using the user interface 135. In some embodiments, the input module 135 provides data indicative of the image of the unique identifier without providing the actual image to the user interface 130. For example, a user uses a smartphone running the user interface application to capture an image of the item having the unique identifier thereon. The smartphone transmits this image, or data indicative of the image, to the central unit 110. In some embodiments, if the input module 135, or the user interface 130, captures an image of the unique identifier, the user interface 130 may interprets, analyzes, or encodes the image, the user interface 130 may transmit data indicative of the image of the unique identifier to the central unit 110 instead of, or in addition to transmitting the image of the unique identifier.

In embodiments where the central unit 110 generates the unique identifier, step 310 may not be performed.

Upon receiving unique identifier, the process 300 moves to step 312, wherein the unique identifier is analyzed. For example, if the unique identifier is a string of alphanumeric characters and is transmitted as a captured image from the input module 135, the central unit 110 may perform OCR or other image analysis to determine the string of alphanumeric characters written or printed on the item. As described above, the central unit 110 may perform image analysis to analyze handwriting on the received image of the unique identifier. In some embodiments, where the unique identifier is pictorial, the image may be stored to facilitate image comparison or recognition. In some embodiments, where the unique identifier is a computer readable code, such as a QR code, the central unit 110 may decode the computer readable code.

The process 300 next moves to decision state 314, wherein it is determined if the unique identifier is a duplicate of another unique identifier already stored in the memory 120 and associated with another item. The central unit 110 queries the memory 120 and compares the received unique identifier, the OCR'd alphanumeric string, the decoded computer readable code, and/or the analyzed image with existing unique identifiers associated with other items stored in the memory 120 to determine if the unique identifier is a duplicate. If the received unique identifier is a duplicate, the central unit 110 generates a message that the unique identifier is a duplicate, and the process 300 returns to step 308, wherein another unique identifier is requested. In some embodiments, the central unit 110 determines an item is a duplicate only when the unique identifier is duplicative of a unique identifier provided by another user. That is, a single user may use or re-use a unique identifier for more than one item without it being identified as a duplicate.

If the received unique identifier is not a duplicate, the process 300 moves to step 316, wherein the received unique identifier, the OCR'd alphanumeric string, the analyzed image, the decoded computer readable code, or the data indicative of the image of the unique identifier (depending on how the unique identifier was received) is stored in the memory 120, and is associated with the user. In some embodiments, the central unit 110 may create a record associated with the unique identifier in the memory 120, such as in a database.

The process next moves to step 318 wherein the user interface 130 requests item information. The item information requested may include the size, weight, volume, dimensions, monetary value, description, contents, classification, or any other desired information regarding the item on which the unique identifier is affixed or is to be affixed. In some embodiments, the central unit 110 may request an image of the entire item, or several views of the same item, if the item is a parcel or irregularly shaped item captured by the input module 135. In some embodiments, the image captured of the item showing the unique identifier may be used as the image for the item information.

The process next moves to step 320, wherein item information is received via the user interface 130. The central unit 110 transmits the item information to the payment system 140, wherein the payment system analyzes the item information and generates a required payment, fee, or postage for the item. For example, the payment system 140 may include look-up tables for various factors such as dimensions, weight, destination, class of service, whether insurance is desired, and the like, from which a payment amount is generated.

In some embodiments, the item information can be determined from the transmitted image of the item with the unique identifier. In some embodiments, the central unit 110 may request and/or receive one or more images of the item taken from different angles, and transmit the one or more images to the payment system 140. The payment system 140 may analyze the images to determine the dimensions of an item, or an item classification, such as letter, parcel, flat, bulk, etc. In some embodiments, the item may have identifying features on the item or the packaging which indicate a particular class of service or dimensions of the item (such as a standard size box, or a first class mail indicator). The payment system can analyze images of the item in order to generate a payment or postage amount.

In some embodiments, the item information may include sender information and recipient/destination information. For example, the user may provide sender information, and the recipient/destination information via the user interface. The central unit 110 stores the sender and recipient/destination information and associates the sender and recipient/destination information with the unique identifier. In this way, when the physical item having the unique identifier thereon is received into the distribution system 150, the distribution system 150 scans or reads the unique identifier and can determine the intended recipient/destination and the sender. In this way, the unique identifier may be the only information physically displayed on the item such that recipient information, e.g., an address, need not be displayed on the item. When the item having only the unique identifier physically displayed is received in the distribution network, the processing equipment, such as mail processing equipment, can read and/or decode the unique identifier. The processing equipment can look up in the memory 120 information received via the user interface and determine the recipient and the sender, and route or process the item accordingly.

The process 300 moves to block 322, wherein the user interface 130 requests payment for the item. The payment system 140 generates payment information for each item. In some embodiments, the user interface 130 displays the amount of payment generated from the payment system 140, and provides options for payment. In some embodiments, the payment may be received as a credit card payment. In this case, the payment information can comprise a payment confirmation. In some embodiments, the user interface 130 may provide access to or navigate a user to a third party payment provider such as PayPal, Google Wallet, or other similar payment system. Upon receipt of payment from the user interface 130, the payment information is transmitted to the payment system 140. The payment system 140 may access the third party payment processor 145, such as the credit card company, PayPal, and the like to receive payment information including a payment confirmation.

In some embodiments, the payment information may include user specific instructions or payment preferences. A user may establish preferences or instructions in the user's account which describe how payment should be handled for the user's items. For example, a user may have established a debit account or a payment account with the distribution network, such that the payment system 140 adds a debit to a user's account upon receiving the unique identifier and the item information. A user may establish a payment account which charges the user in monthly intervals based on the number of items shipped in a month rather than requiring a payment confirmation for each item. In this case, the payment system 140 need not receive a payment for each item. In some embodiments, the payment system 140 generates payment information which instructs the distribution system 150 to charge the user only when the physical item is received into the distribution system 150, and/or to send a bill to the user based on items received. In some embodiments, a user may indicate that a particular item is to be delivered and payment is to be obtained from the recipient.

Upon receiving the payment information, the process 300 moves to decision state 324, wherein it is determined whether the payment information, and any associated payment from the third party payment processor 145 is sufficient for the item. If payment is not sufficient, such as, for example, if the PayPal account lacks sufficient funds, or the credit card is declined, the process 300 returns to step 322, and additional or alternate payment is requested. If payment is sufficient for the item, the process moves to step 326, wherein the payment information is associated with the unique identifier stored in the memory 120 for the item. The process 300 then ends in block 328. In some cases, such as when payment is to be charged when the item is received, or if the payment is to be debited against a customer or user account, this step need not be performed.

FIG. 4 depicts an embodiment of a process for processing an item having a pre-printed or pre-determined unique identifier. A distribution network may pre-print or otherwise affix unique identifiers to items, such as envelopes, postcards, and the like and process the unique identifiers according to process 400.

Process 400 begins in step 402 wherein the distribution network generates a unique identifier. The unique identifier may be generated by the distribution system 150, or by the central unit 110. The central unit 110 stores the unique identifier, or the information encoded within the unique identifier, or both, in the memory 120. For example, a distribution network, such as a Postal Service, may generate a QR code and print the QR code on a box intended for shipment of an item therein. In some embodiments, the QR code may encode information about the envelope, container, package, box, or item to which it is attached or affixed. In some embodiments, the unique identifier may be any desired type of computer readable code. In some embodiments, the unique identifier may further encode information relating to the item. For example, the QR code may encode information indicative of an augmented reality application or presentation, or may encode instructions for navigating a browser to a specific internet location or website which provides, for example, further information regarding the item, promotions, such as coupons or discounts, surveys, social networking links, or any other desired content. In some embodiments, the unique identifier In this way, the recipient of the item having the unique identifier can scan the unique identifier on a smartphone, and see augmented reality content, or any other desired content.

In some embodiments, when the recipient scans the unique identifier using the user interface 130, such as an application on a smartphone, the instance of the scan of the unique identifier by the recipient can be recorded by the central unit 110 and stored in the memory 120, for example, in the account of the user who generated the unique identifier or the item. In this way, the unique identifier may also be used for tracking purposes, and users can know whether recipients scanned the unique identifiers, and assess the effectiveness of the sent items or the additional content associated with the items.

Process 400 next moves to step 404, wherein the unique identifier is provided to the item, such as to the envelope, postcard, box, or the like. The unique identifier may be output to an item via the output module 160, for example, by printing the unique identifier onto envelopes, postcards, boxes, or other similar containers which can be used to ship items within a distribution network. Upon placement of the unique identifier on the item, the item having the unique identifier may be provided to users, such as by being sold to users, shippers, or any entity which may desire to send or ship an item. In some embodiments, a plurality of unique identifiers are generated and provided to a plurality of items.

Process 400 next moves to step 406, wherein the system 100 provides access to a user via a user interface 130 as described elsewhere herein. A user logs to the user interface 130 using a unique set of credentials which identify the user and the user's account to the system 100.

Process 400 moves to step 408 wherein the user interface 130 requests that the user provide the pre-printed or pre-set unique identifier. In step 410, the user interface 130 receives the unique identifier via the input module 135. In some embodiments, this is accomplished by, for example, the user interface 130 requesting that the user provide an image via the user interface 130. The user may take a picture of the unique identifier on the item with a smartphone on which the user interface 130 is provided as an application. The user interface 130 receives the image of the unique identifier and transmits the image or corresponding image data to the central unit 110.

Upon receiving the unique identifier, the process 400 moves to step 412 wherein the unique identifier is decoded or analyzed. The analysis and/or decoding may be performed by the central unit 110. In some embodiments, the analysis and/or decoding may take place on the computer, smartphone, or processor which is running or providing the user interface 130. For example, a user's smartphone running a user interface application may analyze or decode the unique identifier from the image of the unique identifier received via the input module 135. In some embodiments, the central unit 110 may receive the image or image data of the unique identifier and use OCR techniques, or other analysis techniques to interpret or decode the unique identifier.

Upon decoding the unique identifier, the process 400 moves to decision state 414, wherein the central unit 110 determines whether the unique identifier is recognized or valid. This can be accomplished by comparing the unique identifier and/or the information encoded within the unique identifier with the unique identifiers and/or associated information which were stored in the memory 120 at or near the time of generating the unique identifiers in step 402. The central unit 110 may query the memory 120 for a match to the unique identifier. If no corresponding unique identifier is identified, the process 400 returns to step 408, wherein a valid or recognizable unique identifier is requested. This may signify that the user is providing a unique identifier that was not generated by the distribution network, or that cannot be used for an item in the distribution network.

If a corresponding or matching unique identifier is found in the memory 120, the process moves to decision state 416 wherein it is determined whether the recognized unique identifier has been previously used or is a duplicate of an identifier already associated with an item in the distribution network. The central unit 110 compares the received unique identifier with the unique identifiers which are associated with items, or which have already been received into the system 100, such as by another user. If the received unique identifier is already in use, the process returns to step 408, wherein another unique identifier is requested.

If the unique identifier is not a duplicate, or is not already in use, the process 400 moves to step 418, wherein the user interface 130 and/or the central unit 110 requests item information as described with regard to FIG. 3. In some embodiments, the unique identifier may have information stored regarding the item. For example, if the unique identifier is on a postcard, the unique identifier may encode that the item is a postcard, and the central unit 110 can extract this information and store this item information in the memory 120. In some embodiments, as described above, the unique identifier may be affixed to a shipping container, such as a box. The dimensions of the box and/or a class of service can be encoded into the unique identifier. Thus, when the central unit 110 receives the unique identifier, the central unit 110 can identify item information, associate the item information with the unique identifier, the item, and the user, and store these associations. Where the unique identifier encodes item information, the user interface 130 may request only specific item information which is not encoded in the unique identifier, or it may not request any item information, in which case, step 418 need not be performed.

Upon receiving the item information, the process moves to step 420, wherein payment information is requested as described elsewhere herein. Specifically, payment information may be requested in step 420 similar to step 322 of process 300. Process 400 moves to decision state 422, in which the sufficiency of payment is determined similar to decision state 324 described in process 300.

Upon determining that payment is sufficient in step 422, process 400 moves to step 424, wherein payment information or confirmation is associated with the unique identifier, the item information, and the user. The process then ends in step 426.

FIG. 5 depicts an embodiment of a process for receiving an item into a distribution network. Process 500 begins in step 502, wherein an item is received in a distribution network. In some embodiments, a physical item having a unique identifier thereon is received into a distribution network facility, such as a warehouse, handling facility, receiving facility, mailbox, sorting facility, and the like.

Upon receipt of the item, process 500 moves to step 504, wherein the unique identifier on the item is scanned or read. The unique identifier can be scanned or read as the item is placed into a processing or sorting apparatus having scanning capability. In some embodiments, the processing apparatus has the capability to process, scan, and sort items for delivery or sending, such as at a postal service facility. The processing apparatus includes a scanner, such as a QR code reader, a barcode scanner, and/or an optical imager. In some embodiments, where the unique identifier on the item is a QR code, the processing apparatus scans the QR code unique identifier on the item. In some embodiments, the scanner may directly read the QR code, or the scanner may capture an image of the QR code for later processing, analysis, and/or decoding. In some embodiments, where the unique identifier is an alphanumeric string, the scanner may capture an image of the alphanumeric string. In some embodiments, the scanned, read, or image captured of the unique identifier is transmitted to the central unit 110 for analysis. In some embodiments, the distribution system 150 may analyze the unique identifier. In some embodiments, where the unique identifier is a photograph, drawing, logo, icon, or pictorial representation, the image can be captured via an optical scanner and processed.

Upon reading or scanning the unique identifier, the process 500 moves to step 506, wherein the unique identifier is analyzed. In some embodiments, where the unique identifier is a QR code, the distribution system 150, or the central unit 110 decodes the QR code and determines the information associated with the QR code. Where the unique identifier is an alphanumeric string, the distribution system 150 or the central unit 110 receives the captured image and performs OCR or other similar analysis on the image to determine the alphanumeric string printed on or affixed to the item. Upon OCR of the unique identifier, the processing apparatus at the distribution network can extract the alphanumeric string from the image. Where the unique identifier is a logo, photograph, icon, drawing, or other pictorial representation, the distribution system 150 or the central unit 110 receives the captured image and analyzes the image, and/or stores the image for later comparison with a pictorial representation on a received item.

The process 500 next moves to decision state 508, wherein it is determined whether the unique identifier is recognized. The central unit 110 receives the information encoded from the unique identifier, or the alphanumeric string, and/or other information associated with the unique identifier. The central unit 110 queries the memory 120 to determine whether a matching or corresponding unique identifier is stored in the memory 120, or to determine whether a record storing the unique identifier exists in the memory 120. As described above, a unique identifier, or information associated with the unique identifier, is stored in memory when a user scans or otherwise inputs the unique identifier into the input module 135.

If no corresponding entry, record, or unique identifier is stored in the memory 120, the process 500 moves to step 510, wherein the item is held in the distribution system 150. In holding the item, the distribution network may reroute the item, return the item to the sender, flag the item, dispose of the item, or require further action be taken prior to continuing processing, depending on instructions associated with the handling of the item. In holding the item, the distribution network may contact the sender via a user interface and request payment of postage or other fees to ship or send the item.

If a corresponding entry, record, or unique identifier is stored in the memory 120, the process 500 moves to decision state 512, wherein it is determined if the unique identifier is associated with payment information, such as a payment confirmation. As described above, a unique identifier will be associated with payment information upon receiving a payment in the payment system 140, such as from a third party payment processor 145 for the item having the unique identifier thereon. If no payment information is associated with the scanned or read unique identifier, the process 500 moves to step 510, wherein the item is held as described above.

If payment information is associated with the scanned or read unique identifier, which indicates that the user has previously provided payment, postage, or a fee for processing the item, process 500 moves to step 514, wherein the item is processed for delivery in the distribution system 150. This can include moving the item to a location corresponding with a particular mail stream, or to a location in the mail processing equipment downstream of the item scanner. From here, the item can be delivered, shipped, or sent to the intended recipient or location. Process 500 then ends in step 516.

It is to be recognized that depending on the embodiment, certain acts or events of any of the methods described herein can be performed in a different sequence, may be added, merged, or left out altogether. Not all described acts or events are necessary for the practice of the method. Moreover, in certain embodiments, acts or events may be performed concurrently, for example, through multi-threaded processing, interrupt processing, or multiple processors, rather than sequentially.

Although above steps of the above processes have been described a particular order, the steps are not limited to performance in the order indicated. It will be understood by a person of skill in the art, guided by the teachings herein, that the steps of the processes described herein may be performed in one or more orders, as desired. A person of skill in the art will further recognize than the above-outlined steps can be performed in any desired order, and can include sub-steps or sub-processes.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C#), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of inducting a mailpiece into a mailpiece distribution network and identifying and processing postage comprising:
    receiving, via a user operated interface device, an image of a mailpiece having a unique identifier thereon, the unique identifier having been designed by the user and handwritten on the item by the user;

processing the image to generate unique identifier information;

storing the unique identifier information in a memory;

associating the stored unique identifier information with a payment account of the user;

receiving the mailpiece in a distribution network, the mailpiece having the unique identifier thereon;

processing the mailpiece on mailpiece processing equipment comprising a scanning device to generate an image of the unique identifier;

processing the image of the unique identifier to generate read unique identifier information;

querying, by a processor, the memory for the stored unique identifier information determining, by a processor, whether the read unique identifier information corresponds to the stored unique identifier information;

debiting the payment account of the user based on the determination;

generating postage information in response to correspondence between the read unique identifier and the stored unique identifier; and causing the mailpiece processing equipment to move the mailpiece into one of a plurality of locations in response to the postage information.

2. The method of claim 1 further comprising:
receiving, by a processor, mailpiece information relating to the mailpiece;
storing, in a memory, the mailpiece information;
associating, in a memory, the unique identifier with the mailpiece information;
generating payment information for the mailpiece; and
associating, in a memory, the payment information with the unique identifier.

3. The method of claim 1, wherein the unique identifier comprises an alphanumeric string of characters.

4. The method of claim 1, wherein receiving the image of the mailpiece comprises receiving a captured image of the mailpiece having the unique identifier therein.

5. The method of claim 1, wherein the unique identifier is a computer readable code.

6. The method of claim 1, wherein querying the memory comprises querying the memory for payment information associated with the unique identifier, and wherein causing the mailpiece processing equipment to move the mailpiece comprises processing the mailpiece based on payment information associated with the unique identifier.

7. The method of claim 1, wherein the unique identifier includes encoded mailpiece information relating to the mailpiece, and wherein processing the image comprises decoding the encoded mailpiece information.

8. The method of claim 1, wherein processing the image comprises performing optical character recognition on the unique identifier.

9. A system for inducting a mailpiece into a mailpiece distribution network and identifying and processing postage comprising;
a user interface configured to receive an image of a mailpiece having a unique identifier thereon and configured to receive mailpiece information relating to the mailpiece, the unique identifier having been designed by the user and handwritten onto the item by the user;
a processor in communication with the user interface and configured to process the image to generate unique identifier information, and to associate the unique identifier information with a payment account of the user, and the processor further configured to receive the mailpiece information from the user interface;
a payment system, in communication with the processor, configured to receive the mailpiece information from the processor and to generate payment information regarding the mailpiece; and
a memory, in communication with the processor, configured to store the unique identifier information, the mailpiece information, and the payment information;
wherein the processor is further configured to associate the unique identifier information with the mailpiece information and the payment information;
wherein the processor is further configured to associate the payment information with the payment account of the user;
wherein the processor is further configured to debit the payment amount of the user based on the association of the payment information with the payment account;
wherein the processor is further configured to generate postage information in response to the association of the unique identifier information and the mailpiece information; and
wherein the processor is further configured to cause mailpiece processing equipment to move the mailpiece into one of a plurality of locations based on the unique identifier information, the associated mailpiece information, the associated payment information and the associated payment account of the user.

10. The system of claim 9, wherein the unique identifier comprises an alphanumeric string of characters.

11. The system of claim 10, wherein the user interface is configured to receive a captured image of an alphanumeric string of characters.

12. The system of claim 11, wherein the processor is configured to generate an image from the captured image, and to perform optical character recognition of the image of the unique identifier to identify the alphanumeric string of characters.

13. The system of claim 9, wherein the unique identifier is a computer readable code.

14. The system of claim 9, wherein the unique identifier includes encoded mailpiece information relating to the mailpiece, and the processor is configured to decode the mailpiece information encoded in the unique identifier.

15. The system of claim 9 further comprising:
a processing apparatus in communication with the processor, wherein the processing apparatus is configured to:
receive the mailpiece having the unique identifier thereon;
scan the mailpiece to capture an image of the unique identifier;
process the captured image to generate the unique identifier information; and
communicate the unique identifier information to the processor; wherein the processor is further configured to query the memory for stored unique identifier information corresponding to the read unique identifier information and to determine instructions for processing the mailpiece.

16. The system of claim 15, wherein the processor is configured to query the memory for payment information associated with the unique identifier information, and wherein processing apparatus is further configured to process the mailpiece based on the payment information associated with the unique identifier information.

17. A system for inducting a mailpiece into a mailpiece distribution network and identifying and processing postage comprising:
- means for receiving an image of a mailpiece having a unique identifier thereon, the unique identifier having been designed by a user and handwritten on the mailpiece by the user;
- means for processing the image to generate unique identifier information;
- means for storing the unique identifier information;
- means for associating the stored unique identifier information with a payment account of the user;
- means for receiving the mailpiece in a distribution network, the mailpiece having the unique identifier thereon;
- means for processing the mailpiece to generate an image of the unique identifier;
- means for processing the image of the unique identifier to generate read unique identifier information;
- means for querying the memory for the stored unique identifier information;
- means for determining whether the read unique identifier information corresponds to the stored unique identifier information and to the payment account of the user;
- means for debiting the payment account of the user based on the determination;
- means for generating postage information in response to correspondence between the read unique identifier and the stored unique identifier; and
- means for causing the mailpiece processing equipment to move the item into one of a plurality of locations in response to the determination.

* * * * *